United States Patent [19]

Thulin

[11] 3,771,366

[45] Nov. 13, 1973

[54] DEVICE FOR COLLECTION AND MEASUREMENT OF LIQUID VOLUMES

[75] Inventor: Sigrard Thulin, Taby, Sweden

[73] Assignee: AGA Aktiebolag, Lidingo, Sweden

[22] Filed: Mar. 20, 1972

[21] Appl. No.: 236,311

[30] Foreign Application Priority Data
Mar. 26, 1971 Sweden.............................. 3973/71

[52] U.S. Cl............. 73/421 B, 73/425.4 P, 222/204, 222/416
[51] Int. Cl. ........................... G01n 1/10, B01l 3/02
[58] Field of Search..................... 73/421 B, 425.4 P, 73/425.6; 222/204, 405, 416

[56] References Cited
UNITED STATES PATENTS

| | | | |
|---|---|---|---|
| 3,085,717 | 4/1963 | Anscherlick...................... | 222/424.5 |
| 3,015,957 | 1/1962 | Paulson et al..................... | 73/421 B |

*Primary Examiner*—S. Clement Swisher
*Attorney*—Roberts B. Larson et al.

[57] ABSTRACT

A measuring tube with two shanks, the first one having the orifice below the surface of a liquid from which a volume is to be measured, has means to apply a suitable gas pressure above said liquid as compared with the pressure at the orifice of a second shank, there being further between these two shanks a branch with a side-tube, which can also be placed under a suitable gas pressure in relation to the pressure at the orifice of the other shank and to that at the surface of the liquid a controllable valve being adapted to open and close the orifice of the side-tube, a detection device being also placed at a well defined level on the second shank before the orifice of the same in flow direction, and being so arranged that, when the interface between gas and fluid in the measuring tube while the valve is closed reaches the detection level in said shank the detection device actuates a mechanism which opens the valve device thus releasing the volume between said detection level and the side-tube which volume is thus measured.

8 Claims, 3 Drawing Figures

PATENTED NOV 13 1973 3,771,366
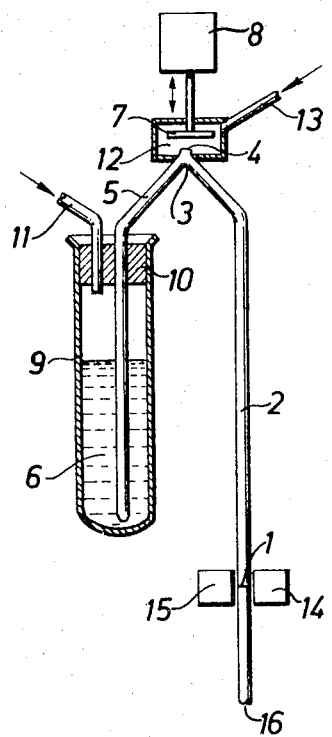
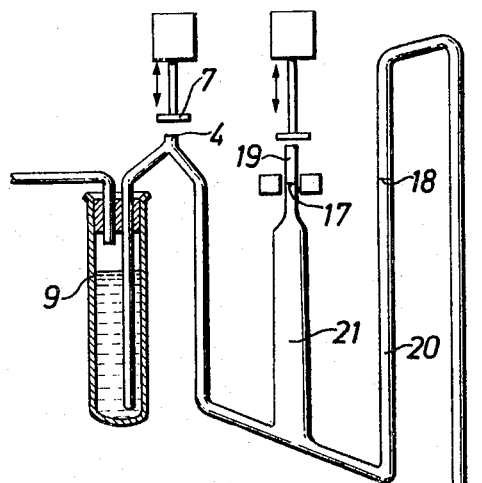
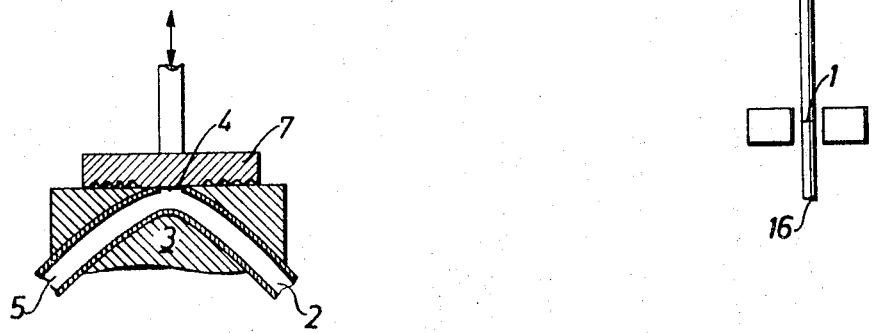

DEVICE FOR COLLECTION AND MEASUREMENT OF LIQUID VOLUMES

The invention relates to a device for automatic collection and measurement of liquid volumes with a graduated tube or the like, the orifice of one shank of which is below the surface of the liquid from which the volume is to be measured, while above the said liquid there can be applied a suitable gas pressure relative to the pressure at the orifice of the other shank of the tube.

Within different branches of industry there is a constantly growing need for automatic sampling at given intervals of time, especially within process engineering. Among the increasingly exacting requirements placed on automatic analysis machines are extremely high reliability, great accuracy, minimal carry-over of sample residues from one sample to the next, and long life. Furthermore it is necessary to be able to sample, not only large, but especially also small and very small quantities of liquid with high accuracy of measurement and with reliable reproducibility. There is a tendency, furthermore, to analyses of smaller sample quantities than earlier. Sampling and measuring devices must therefore be able to collect also very small sample quantities, such as a microlitre or even less, and must have a satisfactory accuracy, especially within this range.

The present invention relates to a device which permits the measurement of variable sample quantities down to an order of a microlitre or less with very good reproducibility, and which fulfils the aforesaid requirements, has no valve in the liquid flow or moving part in the liquid, is simple to clean, and in which alarm functions for supervisory purposes etc. can be simply incorporated.

This is achieved in a device of the kind referred to above through the fact that between the two shanks of the measuring tube there is a branch with a hole or a side-tube which can be placed under a suitable pressure — preferably a gas overpressure relative to the pressure at the orifice and the liquid surface — the orifice or hole in the side-tube being openable and closable by means of a controllable valve device, and through the fact that at least one detecting device is placed at a selectable and well defined level on the shank of the measuring tube not immersed in the liquid, and before the orifice of the shank in the direction of flow, and so arranged that, when the interface between gas and liquid in the measuring tube, with valve closed, reaches the detection level in said shank owing to the higher pressure above the liquid compared to the pressure at the orifice of the second shank of the tube, the detection device actuates a mechanism which opens the valve, and through the fact that the volume in the measuring tube between said detection level and the hole or side-tube corresponds to the volume of liquid to be measured.

For setting of different liquid volumes for measurement the detection device is preferentially displaceable along the shank of the measuring tube not immersed in the liquid. It may be advisable to arrange several fixed and/or displaceable detection devices.

For measurement of small sample volumes the measuring tube should preferably consist of a capillary tube or hose.

For measurement of larger liquid volumes the measuring tube should preferably have an expanded portion or should be connected to an extra container, preferably placed below the branch. The container can advantageously communicate with a space surrounding the hole or side-tube for complete emptying of the container and measuring tube. A negative pressure may also be applied to the orifice of the measuring tube for this purpose.

For greater accuracy and reliability it is advisable to have a second detection device. According to one embodiment of the invention this may be placed at or close to the branch for indication of air bubbles in the measuring tube, which would cause errors in measurement, and for issue of alarm. Alternatively a detection device can be arranged on the measuring tube at a distance from the first detection level such that both detection devices can simultaneously detect the front and rear menisci of the measured liquid volume and such that an alarm is issued if coincidence is not obtained when the said menisci pass the detection devices.

The invention and further developments of it will now be described with reference to the attached drawing, which shows two variants of conceivable embodiments.

FIG. 1 shows schematically one possible embodiment of the invention,

FIG. 2 one of many conceivable variants of the shank of the measuring tube not immersed in the liquid, shaped for measuring large volumes of liquid, and FIG. 3 an alternative form of the branch-point of the measuring tube.

The description can be concretized with reference to FIG. 1, which represents schematically one variant of the invention. The liquid volume to be measured is defined as the volume between a selected an well defined level 1 of one shank 2 of the measuring tube 2, 5 and the part or point 3 of said measuring tube at which a narrow side-tube 4 is branched off. The side-tube 4 can, of course, be replaced by a hole in the measuring tube — see FIG. 3. The shank 5 of the measuring tube 2, 5 is immersed in the liquid 6 from which the desired volume is to be measured. The side-tube or hole 4 can be closed with a valve 7, in FIG. 1 conceived as a rubber diaphragm or the like, the state of which is determined by an actuating mechanism 8 which opens and closes the valve. In the embodiment shown in FIG. 1 the liquid 6 is imagined to be enclosed in a container 9 closed by a plug 10. The gas volume above the liquid 6 can be placed under pressure via a tube 11. For measurement of liquid the side-tube 4 is shut off from the gas volume in a chamber 12 situated at the free end of the side-tube 4 and below the diaphragm 7, since the actuating mechanism 8 presses down the diaphragm 7 against the free end of the side-tube 4, so closing the latter. The chamber 12 is placed under a suitable gas pressure via a tube 13. The pressure difference between tubes 11 and 13 may be as low as 0-10 cm W.G.

Via tube 11 the liquid 6 is placed uder pressure relative to the pressure at the tube orifice 16. The liquid 6 is then forced up through one shank 5 of the measuring tube and down through its other shank 2. The gas volume, which has been shut off in the side-tube 4 between the separating spot or separating element 3 and the diaphragm by the valve 7, prevents the liquid from entering into the side-tube 4 to a significant extent. When the front meniscus of the liquid has reached level 1, this is registered by a detector system 14, 15 which controls the actuating mechanism 8. This mechanism pulls the diaphragm 7 from the orifice of the side-tube 4, whereupon the pressurized gas in chamber 12 flows in through the side-tube 4 and divides the liquid column in the measuring tube into two parts, which are forced out of the respective shanks 5 and 2. The quantity of liquid leaving the shank 2 at its orifice 16 represents the exactly known volume between the branch 3 and detection level 1. A blow-through of gas via tubes 4 and 2 assists as far as possible in quick and quantitative emptying of shank 2 of the measuring tube. A reproducibility of ± 0.01 microlitre has been attained in practical trials.

Immediately after the liquid sample has left the orifice 16, or possibly rather earlier, the valve diaphragm 7 can again close the orifice of the side-tube 4 or the hole 4 in FIG. 3, and the procedure is then repeated.

The device can be dimensioned for measurement of liquid samples of an order of 1 microlitre and upwards, and with very good reproducibiity.

As appears from the foregoing desqription, the invention is characterized in that the liquid is fored through a tube until the meniscus has reached a selected level 1, whereby a specific quantity of liquid is measured and removed through admission of gas at a branch or the like.

This basic idea can be varied and further developed in many ways within the scope of this invention. The valve 7 and its actuating mechanism 8 may be of any kind within the scope of the desired performance of the device as a whole. The same applies to the detector system 14, 15, which may be designed on known principles, e.g. optical, pneumatic, capacitive, inductive, electrical etc., and, if desired, can be duplicated for special purposes.

Alternatively, suitable positive pressures can be aoplied via tubes 11 and 13 or a corresponding negative pressure can be produced at the tube orifice 16. The latter may in principle be either above or below the level of the surface of the liquid 6 from which the sample is to be measured.

The sample volume may be made of any desired magnitude by introduction of an expanded portion in the measuring tube or by providing a container 21 as in FIG. 2. In this case, which is one of many conceivable alternatives, the measurement takes place through detection of the liquid meniscus at level 17 or tube 18. Tube 19 can suitably be connected alternately to the same pressure as at the upper portion of tube 4 for emptying and to the orifice 16 for filling of the container 21 and the tube 20. One possibility is, for filling, to close the valve 7 while tube 19 is open and to apply a positive pressure above the liquid 6 (or a negative pressure at the orifice 16 and the tube 19). When the liquid level in the container 21 reaches detection level 17, the orifice of tube 19 is closed, after which filling may continue only in tube 20 either to level 18 — which in such case may suitably be placed rather higher than level 17 — or to detonation level 1. Thereafter the orifice of the side-tube 4 is opened through valve 7 at the same time as the positive pressure above the liquid 6 relative to the pressure at orifice 16 is removed and gas under positive pressure flows in through the side-tube 4. The orifice of tube 19 is now also opened, possibly under simultaneous connection to the side-tube 4 and for the gas flowing into it. The container 21 and tube 20 are completely emptied, and as soon as the rear meniscus has passed detection level 1 the process can be repeated. Emptying and filling of the container can be modified in several ways within the scope of the invention.

As regards the valve 7 there are many reliable types available. The valve can be made easily replaceable and if necessary therefore be regularly replaced in conjunction with maintenance. The valve itself must provide a seal only against a small positive or negative gas pressure. Even if, under such circumstances, the operating conditions should be very favourable, one cannot altogether disregard the risk of small gas leakages. The measured liquid volume may then contain corresponding gas bubbles and so be erroneous. The risk of such leakage, however, should be fairly small in the case of small sampled volumes, i.e., short sampling times and- /or small differences of gas pressure. And an alarm for this type of error can be fairly easily arranged by means of the detection system. Normally this system must detect only two disturbances in a sampling operation, namely the front meniscus and the rear meniscus of the sampled volume. With one or more air bubbles — even very small bubbles — a correspondingly larger number of disturbances take place per sampling. This fact can easily be used to produce an alarm, e.g. by placing an additional detection device at or in the immediate vicinity of the branch 3 for indication of theese measurement errors caused by air bubbles in the measuring tube. Instead, this additional detection device can be placed after level 1 in the extension of shank 2 of the measuring tube and at such distance from level 1 that the two detectors simultaneously detect the front and rear menisci. By means of suitable coincidence coupling a check can thus be made that the sampled liquid contains the correct volume within given limits. If coincidence is not obtained under given assumptions, the detector system issues an alarm.

What is claimed is:

1. Apparatus for the collection of a measured liquid volume from a body of a liquid comprising:
   a first downwardly extending tube having a first orifice at its lower end in fluid communication with a container for holding a body of a liquid;
   a second downwardly extending tube having a second orifice at its lower end;
   a narrow tubular member connecting the upper ends of said first and second downwardly extending tubes and forming therewith a generally inverted U shaped tube, said narrow tubular member including a narrow orifice for the introduction of a gas;
   means for causing a differential pressure to exist between said body of liquid at said first orifice and the liquid at said second orifice, the pressure at said first orifice being higher whereby liquid in said container is caused to flow from said first orifice through said generally U shaped tube and out of said second orifice;
   means for introducing gas through said narrow orifice of said narrow tubular member at a pressure higher than that prevailing at said first orifice for separating a volume of liquid in said U shaped tube into a first portion extending from said narrow orifice to said first orifice and a second portion extending from said narrow orifice to said second orifice;

valve means for regulating the itroduction of a gas through said narrow orifice, said gas being at a pressure higher than that at said first orifice;

detecting means for detecting a liquid-gas interface positioned adjacent a well defined portion of said second downwardly extenting tube; and control means for said valve means responsive to said detection means whereby when a liquid gas interface formed by liquid flowing from said container through said generally U shaped tube passes said detection means, said valve means is actuated to introduce a gas through said narrow orifice into said narrow tubular orifice to separate the liquid volume in said generally U shaped conduit into said two portions, said second portion being the measured volume and flowing out of said second orifice for collection.

2. Apparatus according to claim 1 wherein said narrow tubular member comprises a capillary tube.

3. Apparatus according to claim 2 wherein said first and second downwardly extending tubes comprises capillary tubes.

4. Apparatus according to claim 1 wherein the generally U shaped tubes has an expanded portion located between said narrow tubular member and said detection means whereby the measured volume is enlarged.

5. Apparatus according to claim 1 wherein said orifice of said narrow tubular member comprises a valve seat of said valve means.

6. Apparatus according to claim 1 further including means for incresing the pressure of liquid at said first orifice above atmospheric pressure.

7. Apparatus according to claim 6 wherein said second orifice is open to the atmosphere.

8. Apparatus according to claim 1 wherein said second orifice is lower than said first orifice.

* * * * *